T. H. WORRALL.
Self Centering Chuck or Holder.

No. 48,612.

Patented July 4, 1865.

WITNESSES

INVENTOR

T. H. Worrall

UNITED STATES PATENT OFFICE.

THOS. H. WORRALL, OF LAWRENCE, MASSACHUSETTS.

IMPROVED SELF-CENTERING CHUCK OR HOLDER.

Specification forming part of Letters Patent No. 48,612, dated July 4, 1865.

*To all whom it may concern:*

Be it known that I, THOMAS H. WORRALL, of Lawrence, in the county of Essex and State of Massachusetts, have invented a new and Improved Self-Centering Chuck or Holder; and I do hereby declare that the following is a full, clear, and exact description thereof, which will enable others skilled in the art to make and use the same, reference being had to the accompanying drawings, forming part of this specification, in which—

Figure 1:
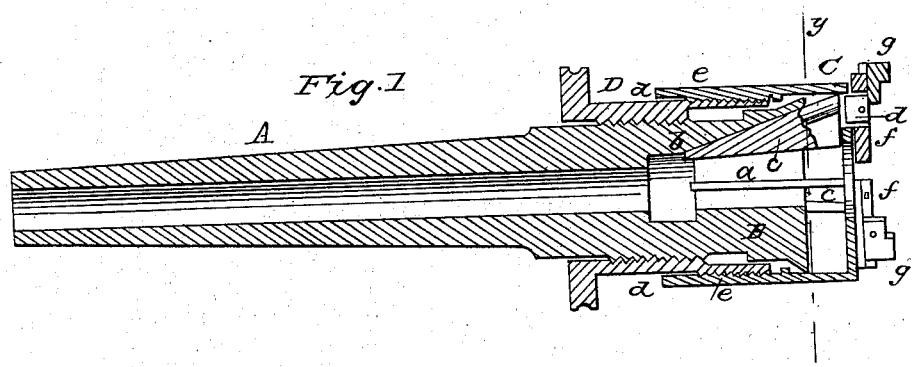
Figure 2:
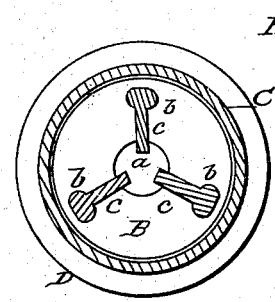
Figure 3:
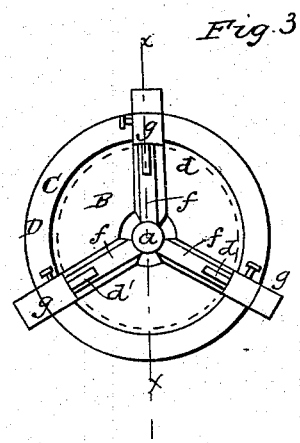

Figure 1 represents a longitudinal central section of this invention, the line $x\ x$, Fig. 3, indicating the plane of section. Fig. 2 is a transverse section of the same, the plane of section being indicated by the line $y\ y$, Fig. 1. Fig. 3 is a front elevation of the same.

Similar letters of reference indicate like parts.

This present invention relates to an improvement on a self-centering chuck patented by me March 7, 1865. Said chuck is composed of three (more or less) wedge-shaped jaws, which move in inclined diverging ways, being forced out and opened by the action of a spring, and being forced in and closed by means of a screw-cap.

In the chuck or holder which forms the subject-matter of this present application for a patent the spring is discarded, and instead of this the jaws are provided with projections extending through slots in the longitudinally-sliding cap, and provided with rigid or adjustable tips or screws, in such a manner that the jaws are compelled to move in and out with the cap and a positive motion is imparted to said jaws in either direction. If adjustable tips are applied to the jaws, the chuck can be used for holding articles of large or small diameters eccentrically or concentrically with the spindle to which the chuck or holder may be attached. The longitudinal motion of the cap may be produced by two screws of different pitch, whereby the power with which the jaws are caused to gripe the articles to be held between them can be increased to any desired extent.

A represents a spindle or mandrel, which may be turned off tapering to fit into the spindle of a turning-lathe, or which may be cylindrical and represent a portion of a line-shaft or needle-bar of a sewing-machine or any other equivalent part of another machine, as will be hereinafter more fully explained. The spindle or mandrel A may be hollow, as shown in the drawings, or it may be solid, and it terminates in a head, B, which is provided with a central cavity, $a$, and with three (more or less) inclined ways, $b$, which diverge toward the outer end of said head, as clearly shown in Fig. 1 of the drawings. These ways are intended to receive the wedge-shaped jaws $c$, which are pear-shaped, as clearly shown in Fig. 2, so that they are retained in the ways by their heads or thick parts, and that they are compelled to move in the direction prescribed by said ways. The outer ends of said jaws are provided with projections $d'$, which extend through slots or mortises in the cap C. This cap is fitted over the head B, and its position is regulated by the action of a thimble, D, which is provided with an internal screw-thread, $d$, to screw on a corresponding male thread on the external surface of the head B.

The connection between the cap C and the thimble D may be effected in various different ways. In the drawings a screw-thread, $e$, is shown to effect this purpose. This screw-thread is cut on the external surface of the thimble and in the inner surface of the cap, and its pitch must be different from that of the screw-thread $d$, for if both screw-threads were made of the same pitch, by turning the thimble no motion would be imparted to the cap; but if the screw-thread $d$, for instance, is number 10 and the screw-thread $e$ number 20, five revolutions given to the thimble from left to right (provided the threads are right-handed) will cause the same, together with the cap, to travel half an inch in the direction toward the front end of the chuck, while at the same time the cap, independent of the thimble, would travel one quarter inch in the opposite direction, thus imparting to said cap a motion of one-quarter inch in the direction toward the front end of the chuck. By this motion of the cap the jaws will open, and by turning the thimble in the opposite direction the jaws will close up. If the connection between the cap and thimble should be effected by a pin passing through said cap and catching into a circular groove in the thimble, each revolution of said thimble would produce a motion of the cap equal to the pitch of the screw-thread $d$. I use, by preference, the differential threads $d\ e$, because by their use I am enabled to cause the jaws to gripe the articles to be held between them with much larger power than I could with the single thread.

In order to connect the jaws to the cap I secure to the projections $d'$ the cross-pieces $f$, and these pieces may be so shaped that they form ways for the adjustable tips $g$. These tips are secured to the cross-pieces by set-screws, so that they can be moved closer to or farther from the center, or that they can be reversed if it should be desirable. Said adjustable tips $g$ may, however, be omitted and the cross-pieces $f$ applied without them.

Instead of the cross-pieces $f$, simple screws might be inserted into the outer ends of the jaws, with their heads bearing on the outer surface of the cap.

Instead of using the thimble and the cap, the thimble might be discarded and the cap made to screw directly on the head B. In this case the projections of the jaws would have to be made to project through the central opening in the cap to allow the latter to rotate, and the cross-pieces $f$ would have to be applied the same as above described.

This chuck may be used for holding and boring or turning all kinds of articles, and when the tips $g$ are adjustable said articles may be secured concentrically or eccentrically to the spindle or mandrel A. My chuck may also be used in place of a vise or hand-vise, or for a tap or reamer wrench, by having a suitable handle attached to it. It may also serve as a shaft-coupling, and in this case it may have a set of jaws fitted into each end of the coupling, or one set to take hold of the ends of two shafts of the same size. It can be further used for holding fliers on the spindles of cotton machinery, and by leaving the angle of the jaws very long they can be operated with a milled nut, so as to hold quite rigid. It may also be used on spinning-frames to hold the spindles, and it may be used to hold the dies for cutting threads or screws. The jaws may also be fitted directly into the spindles of lathes or milling-machines and into needle-bars of sewing-machines, to hold the needle, in place of a set-screw.

Several sets of jaws may go with one chuck and be of any desirable shape.

The end of the screw-cap may be made thick enough to have the ways for the jaws cut in said cap instead of the chuck. By simply reversing the jaws they can operate in this manner as well as when fitted in the head of the chuck.

Instead of expanding the outer inclined edges of the jaws to keep them in their ways, a round flat spring may be placed between them and the enlarging dispensed with.

I claim as new and desire to secure by Letters Patent—

1. The projections $d'$, or their equivalents, extending from the ends of the jaws $c$, and operating, in combination with cross-pieces $f$, or their equivalents, and with the cap C, substantially as and for the purpose herein set forth.

2. The adjustable tips $g$, in combination with the jaws $c$, cap C, and mandrel A, constructed and operating substantially as and for the purpose described.

3. The differential screws $d\ e$, applied, in combination with the thimble D, cap C, jaws $c$, and mandrel A, substantially as and for the purposes specified.

THOS. H. WORRALL.

Witnesses:
GEO. H. GERRY,
REUBEN TUTTLE.